United States Patent [19]

Hsieh et al.

[11] 4,136,137

[45] Jan. 23, 1979

[54] BLOCK COPOLYMERS

[75] Inventors: Henry L. Hsieh; Floyd E. Naylor, both of Bartlesville, Okla.

[73] Assignee: Phillips Petroleum Company, Bartlesville, Okla.

[21] Appl. No.: 904,121

[22] Filed: May 8, 1978

Related U.S. Application Data

[63] Continuation-in-part of Ser. No. 636,488, Dec. 1, 1975, abandoned, which is a continuation-in-part of Ser. No. 141,996, May 10, 1971, abandoned.

[51] Int. Cl.$^2$ ............................................. C08F 293/00
[52] U.S. Cl. ........................ 260/880 B; 260/33.6 UA; 428/462
[58] Field of Search ..................................... 260/880 B

[56] References Cited

U.S. PATENT DOCUMENTS

| | | | |
|---|---|---|---|
| 2,338,741 | 1/1944 | Soday | 260/86.5 |
| 2,338,742 | 1/1944 | Soday | 260/86.5 |
| 2,338,743 | 1/1944 | Soday | 260/86.5 |
| 3,239,478 | 3/1966 | Harlan | 260/27 |
| 3,513,056 | 5/1970 | Middlebrook | 156/309 |
| 3,576,913 | 4/1971 | Johnson et al. | 260/880 |
| 3,622,551 | 11/1971 | Davis | 260/84.1 |
| 3,728,193 | 4/1973 | McKeener et al. | 153/334 |

*Primary Examiner*—Stanford M. Levin

[57] ABSTRACT

Block copolymers and adhesive compositions comprising a block copolymer of a conjugated diene, styrene, and a hydrocarbyl-substituted styrene, the block copolymer having an inherent viscosity within the range of from about 0.5 to about 3.

8 Claims, No Drawings

BLOCK COPOLYMERS

This application is a continuation-in-part application of our pending application having Ser. No. 636,488, filed Dec. 1, 1975, now abandoned, which in turn is a continuation-in-part of abandoned application having Ser. No. 141,996, filed May 10, 1971.

This invention relates to block copolymers and to adhesive formulations.

In one of its more specific aspects, this invention relates to the use of block copolymers of dienes and hydrocarbyl-substituted styrenes as adhesives.

The use of block copolymers, either linear or branched, in adhesive compositions is well known. Such block copolymers are usually solid rubbery materials which are employed as a solution of the polymer in a suitable solvent vehicle.

According to the inventions set forth in said prior applications, there are provided adhesive formulations employing as the copolymer a block copolymer produced by the polymerization of conjugated dienes and hydrocarbyl-substituted styrenes or mixtures thereof with styrene. These block copolymers are further characterized as having high green strength, i.e., high tensile strength in an uncured condition. The block copolymers of the invention can be linear or branched (radial) and can be represented by the general formulas (1) A — B — A and (2) (A — B)$_x$Z wherein A is a resinous (nonrubbery) polymer block and B is a rubbery polymer block and wherein Z represents the residue from a coupling agent which is capable of coupling two or more (A — B —) polymer blocks together and wherein x represents the number of (A — B —) polymer blocks thus coupled and is at least two and can be equal to the number of functional groups in the coupling agent. It can be seen that if x in formula (2) above is greater than two, a branched block copolyemr results, while if x is 2, a linear block copolymer is formed. Formula (1) also represents a linear block copolymer. It can also be noted that the above block copolymers have at least two terminal blocks per molecule that are resinous (nonrubbery) in nature. The resulting adhesive possesses high green strength, high tack, good film quality, and the formulation exhibits a low viscosity.

According to the present invention, rubbery radial block copolymers are provided consisting essentially of a conjugated diene, styrene, and a hydrocarbyl-substituted styrene wherein the block copolymer is represented by the general formula (A — B)$_x$Z wherein A is a resinous (nonrubbery) polymer block of styrene and hydrocarbyl-substituted styrene and B is a rubbery polymer block of a conjugated diene and Z is a residue from a coupling agent having at least three reactive sites and x is greater than 2.

The conjugated dienes which can be used to produce the block copolymers are those having 4 to 12, and preferably 4 to 8, carbon atoms per molecule and are such as are disclosed in the prior art including 1,3-butadiene, isoprene, 1,3-pentadiene, 1,3-octadiene, 1,3-dodecadiene, 2-methyl-1,3-hexadiene, and the like.

The hydrocarbyl-substituted styrenes employable can be represented by the general formula

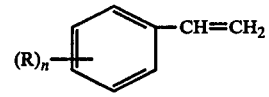

wherein n is an integer having a value within the range of 1 to 5 and wherein R is a hydrocarbyl radical containing from 1 to 12, preferably 3 to 8, carbon atoms. It is preferred that the total number of carbon atoms in the substituent R group, or R groups, be not greater than about 12. R is selected from the group consisting of alkyl, cycloalkyl, aryl, alkenyl, cycloalkenyl, and combinations thereof such as cycloalkylaryl or aralkyl, and the like. When R is alkenyl or cycloalkenyl or combinations thereof, such unsaturated substituents are of the nonpolymerizable type at polymerization conditions employed in producing the block copolymers concerned.

Examples of suitable hydrocarbyl-substituted styrenes include 4-methylstyrene, 3-ethylstyrene, 2,3,4,5,6-pentamethylstyrene, 4-tert-butylstyrene, 2,4,6-triethylstyrene, 4-cyclopentylstyrene, 4-(1-methylcyclohexyl)styrene, 4-n-dodecylstyrene, 4-(4-n-octenyl)styrene, 3,5-di(2-cyclopentenyl)styrene, 4-(2-ethyl-2-hexyl)styrene, 3-(2-methyl-2-butyl)styrene, 4-phenylstyrene, 3-(4-cyclobutyl-1-octyl)styrene, 2,6-diethylstyrene, and the like.

It is to be understood that mixtures of hydrocarbyl-substituted styrenes with styrene can be employed in the method of this invention. It is also to be understood that mixtures of hydrocarbyl-substituted styrenes can be employed and that such mixtures can include styrene. When mixtures of the hydrocarbyl-substituted styrenes with styrene are employed in the production of the block copolymers, or if the hydrocarbyl-substituted styrene is used alone, the total amount of hydrocarbyl-sustituted styrenes employed is in the range of from about 1 to about 20, preferably 2 to 7, parts by weight per hundred parts by weight of the total monomers, including the diene content, which are employed, and the weight ratio of conjugated diene monomer to hydrocarbyl-substituted styrene or mixture thereof with styrene is from about 50 to 50 to about 90 to 10, and preferably from about 65 to 35 to about 85 to 15. In view of the above-described ranges for the hydrocarbyl-substituted styrene content and the conjugated diene monomer content, it is readily apparent that for the embodiment wherein hydrocarbyl-substituted styrene(s) are used alone, i.e., no styrene in admixture therewith, the ratio of conjugated diene monomer to said hydrocarbyl-substituted styrene(s) is from 80/20 to 90/10 for such block copolymers. However, for the embodiment wherein a mixture of styrene and hydrocarbyl-substituted styrene is employed, it is apparent that a large number of compositions are encompassed within said ranges of hydrocarbyl-substituted styrene content and conjugated diene monomer content. For example:

| Diene/Styrene/Hydrocarbyl-Substituted Styrene | | |
|---|---|---|
| 50 | 49 | 1 |
| 50 | 30 | 20 |
| 60 | 39 | 1 |
| 60 | 20 | 20 |
| 70 | 29 | 1 |
| 70 | 10 | 20 |
| 80 | 19 | 1 |
| 80 | 1 | 19 |

-continued

| Diene/Styrene/Hydrocarbyl-Substituted Styrene | | |
|---|---|---|
| 90 | 9 | 1 |
| 90 | 1 | 9 |

If mixtures of the hydrocarbyl-substituted styrene and styrene are employed, these monomers can be introduced into the polymerization reaction mixture as a preformed mixture or each can be individually introduced, the first-introduced being polymerized to any desired extent before the addition of those subsequently introduced. When mixtures of the hydrocarbyl-substituted styrene and styrene are employed during polymerization, the resulting polymer will have A blocks containing both monomers.

The polymerization conditions at which the polymers of this invention are formed, including temperature, pressure, reaction time, polymerization initiator levels, presence of inert hydrocarbon diluents in the reaction mixture and methods of recovery of the block polymer from the reaction mixtures are those well known in the art. For example, radial block copolymers of the above type can be prepared by the procedures disclosed in U.S. Pat. No. 3,281,383 and linear block copolymers can be prepared by the procedures of U.S. Pat. No. 3,251,905.

The block copolymers suitable for use in this invention will have an inherent viscosity within the range of from about 0.5 to about 3 and preferably from about 0.9 to about 2, as determined by that procedure set forth in U.S. Pat. No. 3,278,508. The block copolymers of this invention can be recovered from the polymerization reaction mixture by the usual prior art procedures. For example, the polymers can be recovered by evaporation of the diluent, by precipitation of the polymer from solution with a nonsolvent (coagulant), or by steam stripping the polymerization reaction mixture.

Since it is well known that the inherent viscosity of the block copolymers is generally inversely proportional to the polymerization initiator level, one skilled in the art can readily determine the proper initiator level to employ for the preparation of block copolymers having inherent viscosities within the ranges disclosed above.

As indicated in the U.S. patents cited above, the organolithium compounds are preferred as polymerization initiators for the preparation of the block copolymers useful in this invention.

It is preferred that the polymerization reaction be carried out in the presence of an inert hydrocarbon diluent. Typical suitable diluents would include n-butane, n-hexane, cyclohexane, cyclooctane, toluene, benzene, and the like. Mixtures of such compounds can also be employed. If desired, ethers or thioethers can also be employed as the polymerization diluent alone or in admixture with the above hydrocarbons. If ethers or thioethers are thus employed, reasonable care should be exercised to see that the presence of these compounds does not prevent the formation of the block copolymers of this invention. Step-wise addition and polymerization of the various monomers employed are an effective procedure for forming the block copolymers when ethers or thioethers are present in the polymerization reaction mixture. Suitable ethers and thioethers would include diethyl ether, tetrahydrofuran, 1,4-dioxane, di-n-butyl sulfide, and the like.

As set forth in U.S. Pat. No. 3,281,383, a polyfunctional coupling agent containing at least three reactive sites is added to the polymerized reaction mixture at the conclusion of polymerization. The polyfunctional coupling agent reacts with the lithium-carbon bond in the polymer and thereby couples the reagent to the polymer at this bond. Suitable reagents that can be employed include the polyepoxides, polyisocyanates, polyimines, polyaldehydes, polyketones, polyanhydrides, polyesters, polyhalides, and the like. These compounds can contain two or more types of functional groups such as the combination of epoxy and aldehyde groups or isocyanate and halide groups. Especially preferred among the polyepoxides are the epoxidized hydrocarbon polymers such as epoxidized liquid polybutadiene and the expoxidized vegetable oils such as epoxidized soybean oil and epoxidized linseed oil. Among the polyhalides the silicon tetrahalides such as silicon tetrachloride are preferred. Generally, the amount of polyfunctional coupling agent used is in the range of 0.1 to 1.5 equivalents of coupling agent, based upon the lithium present in the polymer.

The block copolymers of the invention are preferably employed in the form of a solution of the polymer in a suitable solvent vehicle in which the total solids concentration will generally be within the range of from about 10 to about 35 percent by weight. These vehicles can be, for example, naphthas and toluene, or mixtures thereof. Tackifiers, antioxidants, plasticizers, fillers, and other materials which can be conjunctively employed in the adhesive formulations of this invention are those well known in the art.

In accordance with one presently preferred embodiment of the invention, the adhesive composition consists essentially of (a) a linear or branched (radial) block copolymer produced by the polymerization of conjugated dienes and hydrocarbyl-substituted styrenes or mixtures thereof with styrene as above described and (b) a tackifier.

The adhesive compositions of this invention are of the pressure-sensitive type and as such generally are applied to a substrate in the form of a solution, dispersion, or emulsion. The amount of solvent employed is usually sufficient to provide a solution or dispersion in which the total solids concentration is within the range of about 10 to about 35 percent by weight, although the amount of solvent employed will often depend upon the particular method of applying the adhesive to a substrate and can vary appreciably.

Any inert organic solvent can be used as a solvent in the adhesive compositions of this invention. Paraffinic hydrocarbons such as pentane, hexane, heptane, octane, nonane, and the like can be used. Cycloparaffinic hydrocarbons such as methylcyclopentane, cyclohexane, methylcyclohexane, and the like can be used. Aromatic hydrocarbons such as benzene, toluene, and xylene can be used. The preferred solvents are the cycloparaffinic hydrocarbons or mixtures thereof or mixtures of cycloparaffinic hydrocarbons with aromatic hydrocarbons. Commercially available solvent mixtures such as naphthas (precipitation grade) are also preferred solvents for the formulation. In one preferred embodiment, the organic solvent is a mixture of naphtha and toluene.

The amount of solvent present in the adhesive compositions is generally sufficient to reduce the viscosity of the adhesive composition to a point where it can easily be applied to the surface of the material to be bonded. The viscosity of the adhesive composition can vary over a wide range. For example, it can be very viscous, paste-like material when it is used for such purposes as applying floor tile, wall tile, and the like. On the other hand, the solvent level of the adhesive composition can reduce the viscosity to a very low level for application through spray guns, aerosol applicators, and the like. It will be obvious to those skilled in the art that the exact amount of solvent added to the adhesive composition will be regulated by the use for which the adhesive composition is formulated.

Component (b) of the pressure-sensitive adhesive compositions of this invention is a material known in the art as a tackifier. These tackifiers can be any of the resinous substances known for enhancing tack of adhesive compositions. Examples of suitable tackifiers for use in accordance with this invention are those alkyd resins prepared by esterifying monocarboxylic or polycarboxylic acids with polyhydric alcohols. Such tackifiers are well known in the art and are exemplified by rosin, rosin derivatives, polyterpene resins, thermoplastic phenolic resins, hydrogenated rosin esters of pentaerythritol, coumarone-indene resins, and the like.

The amount of tackifier added to the adhesive compositions of this invention is generally in the range of 0.4 to 1.5 parts by weight of a tackifier per one part by weight of block copolymer.

The following examples will serve to further delineate the nature of adhesive formulations which can be prepared with the block polymers of this invention. It will be seen that these adhesive formulations have unexpectedly low solution viscosities but high shear adhesion strength for the adhesive in comparison to formulations employing block butadiene/styrene copolymers of a similar type. The low solution viscosity of the present formulations facilitates their being handled. The high shear adhesion strength is, of course, a most desirable property of such adhesive compositions.

EXAMPLE I

Radial block copolymers of butadiene with styrene or mixtures thereof with 4-tert-butylstyrene were prepared employing n-butyllithium as an initiator, a cyclohexane diluent, a temperature of about 70° C., a reaction time of about 30 minutes during which the styrene and tert-butylstyrene were polymerized, and an additional reaction period of about 30 minutes after the addition of butadiene. Polymerization of "styrenes" was essentially complete before butadiene was added. The polymerization recipe consisted of 780 parts by weight of cyclohexane, about 0.05 part by weight of tetrahydrofuran and styrene, 4-tert-butylstyrene and butadiene and n-butyllithium, in the parts indicated below. Each run was terminated with 0.5 part by weight of Epoxol 9-5, an epoxidized linseed oil having about six oxirane groups per molecule of glycerol triester. After each run, an antioxidant was introduced into the reaction mixture, the reaction mixture was coagulated, and the polymer was separated and dried. The properties of the polymers and the components used in their preparation were as follows:

| Polymer | Styrene, parts | 4-tert-butyl-styrene, parts | Buta-diene, parts | Inherent Viscosity | n-Butylli-thium, mhm$^a$ |
| --- | --- | --- | --- | --- | --- |
| 1 | 40 | 0 | 60 | 0.87 | 2.6 |
| 2* | 30 | 10 | 60 | 0.86 | 2.6 |
| 3* | 20 | 20 | 60 | 0.88 | 2.6 |
| 4* | 30 | 10 | 60 | 1.02 | 2.2 |
| 5* | 30 | 10 | 60 | 1.17 | 2.0 |
| 6* | 35 | 5 | 60 | 1.03 | 2.2 |

*Invention runs.
a — mhm = gram millimoles per 100 g of monomer(s).

These polymers were individually compounded into pressure-sensitive adhesives employing the following recipe:

| Component | Parts by Weight |
| --- | --- |
| Polymer | 100 |
| Tackifier | 100 |
| Antioxidant | 1 |
| Naphtha, precipitation grade | 419 |
| Toluene | 47 |

The tackifier was pentaerythritol ester of hydrogenated rosin and the antioxidant was octadecyl ester of 3(3,5-di-tert-butyl-4-hydroxy)phenylpropionic acid.

The resulting adhesives had the following properties:

| Polymer | Formulation Viscosity, cp | Probe Tack, g | Shear Adhesion, Hours to Failure |
| --- | --- | --- | --- |
| 1 | 8,600 | 354 | 1.7 |
| 2* | 122 | 0 | 0.1 |
| 3* | 114 | 0 | 0.03 |
| 4* | 280 | 0 | 1.6 |
| 5* | 1,392 | 557 | 0.6 |
| 6* | 1,120 | 37 | 5.7 |

*Invention runs.

Viscosities in centipoises are by Brookfield Viscosimeter Model RVF at 24° C. Probe tack was determined by Polyken Probe Tack Tester per J. Applied Poly. Sci., 14, p.2039 (1970). Shear adhesion is based upon the time required at 90° C. for 1/16-inch slippage of the bond formed by one square inch overlap of an adhesive-coated Mylar film on a steel substrate, the shearing stress being applied by a 2-pound weight being hung from the vertical 1-inch wide strip of Mylar film and being attached at an angle of 178° to the substrate.

The above data illustrate that the adhesive compositions of this invention possess high shear adhesion strength and relatively low formulation viscosities.

It is to be emphasized that while the above examples employed certain reagents in the preparation of the polymers, the polymers of this invention can be produced employing any of the diluents, initiators, antioxidants, coagulants, coupling agents, and the like conventionally employed in polymerization reactions of the type concerned.

EXAMPLE II

Radial block copolymers of 1,3-butadiene with mixtures of styrene and 4-tert-butylstyrene were prepared in accordance with the general procedure outlined above to produce polymers which were individually compounded into the adhesive formulations as previously defined. Polymers 7–12 were prepared with 0.5 part and polymers 13–18 with 0.3 part of Epoxol 9-5 terminating agent. The charge order and polymer recovery procedures were essentially the same as those given in Example I except that the antioxidant was changed to 2,6-di-tert-butyl-4-methylphenol. Tests on the resulting adhesives were as follows:

| Polymer | Parts per Hundred | | | Inherent Viscosity | Adhesive Properties | | |
|---|---|---|---|---|---|---|---|
| | Styrene | 4-tert-Butylstyrene | Butadiene | | Visc., cp | Tack, g | Shear Adhesion, Hrs. |
| 7 (Control) | 30 | 0 | 70 | 1.26 | Insol. | 860 | 5.2 |
| 8 | 29 | 1 | 70 | 1.18 | 8,500 | 900 | 5.8 |
| 9 | 27 | 3 | 70 | 1.16 | 1,160 | 920 | 4.6 |
| 10 | 25 | 5 | 70 | 1.26 | 1,100 | 720 | 6.1 |
| 11 | 24 | 6 | 70 | 1.32 | 1,050 | 740 | 5.1 |
| 12 | 22 | 8 | 70 | 1.31 | 910 | 520 | 3.0 |
| 13 (Control) | 30 | 0 | 70 | 1.36 | Insol. | 850 | 4.2 |
| 14 | 29 | 1 | 70 | 1.39 | Insol. | 910 | 9.6 |
| 15 | 27 | 3 | 70 | 1.25 | 1,580 | 850 | 9.7 |
| 16 | 25 | 5 | 70 | 1.38 | 950 | 820 | 9.0 |
| 17 | 24 | 6 | 70 | 1.25 | 740 | 860 | 3.6 |
| 18 | 22 | 8 | 70 | 1.29 | 570 | 670 | 2.2 |

Due to the insolubility of polymers 7, 13, and 14 in the original formulation, the amount of toluene in the formulation recipe was doubled.

The above data indicate suitability of the compositions of this invention when prepared from 4-tert-butylstyrene and styrene mixtures. The above results demonstrate that polymers of this invention provide adhesive formulations of greatly reduced viscosity, excellent tack, and improved shear adhesion strength.

EXAMPLE III

Radial block copolymers of butadiene with styrene or 4-methylstyrene or a mixture thereof were prepared in accordance with the general procedures outlined above to produce polymers which were individually compounded into the adhesive formulations comparable to those previously defined. Each run was terminated with 0.3 phm of Epoxol 9-5 All copolymers had inherent viscosities within the range of 1.25 to 1.75. Tests of the resulting adhesives were as follows:

| Polymer | Parts per Hundred | | | Adhesive Properties | | |
|---|---|---|---|---|---|---|
| | Styrene | 4-Methylstyrene | Butadiene | Visc., cp | Tack, g | Shear Adhesion, Hrs. |
| 19* | 30 | 0 | 70 | 98,000 | 690 | 2.7 |
| 20* | 30 | 0 | 70 | 104,000 | 680 | 2.5 |
| 21 | 29 | 1 | 70 | 110,000 | 700 | 2.0 |
| 22 | 27 | 3 | 70 | 20,400 | 740 | 2.6 |
| 23 | 25 | 5 | 70 | 20,800 | 680 | 2.8 |
| 24 | 20 | 10 | 70 | 3,700 | 640 | 4.1 |
| 25 | 10 | 20 | 70 | 1,720 | 630 | 4.6 |
| 26* | 0 | 30 | 70 | 1,050 | 320 | 4.2 |

*Control.

Test procedures were as previously defined. These data indicate the suitability of 4-methylstyrene as a reactant in the preparation of the adhesives of this invention. The results above illustrate again the reduced viscosity and improved shear adhesion strength that can be obtained employing the block copolymers of this invention.

EXAMPLE IV

In a manner comparable to that previously defined, copolymers of butadiene, styrene, and 4-ethylstyrene were produced, terminated with 0.7 mhm (millimoles per 100 grams monomers) of silicon tetrachloride, and compounded into adhesive formulations having the following composition and properties:

| Polymer | Parts per Hundred | | | Inh. Visc. | Adhesive Properties | | |
|---|---|---|---|---|---|---|---|
| | Styrene | 4-Ethylstyrene | Butadiene | | Visc., cp | Tack, g | Shear Adhesion, Hrs. |
| 27 | 30 | 10 | 60 | 1.05 | 300 | 0 | 1.8 |
| 28* | 0 | 40 | 60 | 1.16 | 320 | 0 | 0.05 |

The above data indicate that that adhesive composition encompassed by the scope of this invention possesses a reduced formulation viscosity and increased shear adhesion strength as compared with that formulation outside the scope of this invention.

EXAMPLE V

Other runs were made employing the general procedures of Example I with two different initiator levels and the monomer composition of Polymer 10. Each run was terminated with the stoichiometric amount (based on the amount of n-butyllithium initiator) of silicon tetrachloride. The copolymers thus prepared were individually compounded into the adhesive formulation recipe shown in Example I. The properties were determined as before, and the results are shown below for these polymers and the formulations.

| Polymer | n-Butyllithium, mhm | Inh. Visc. | Adhesive Properties | | |
|---|---|---|---|---|---|
| | | | Visc., cp | Tack, g | Shear Adhes., Hrs. |
| 29 | 1.6 | 1.86 | 7,350 | 690 | 35 |
| 30 | 1.8 | 1.54 | 1,620 | 630 | 22 |

The above data demonstrate the outstanding properties, particularly in respect to shear adhesion, of the adhesive composition of this invention.

It is to be understood that while the polymers of this invention have been illustrated in formulations with certain defined solvents, tackifiers, and antioxidants, the polymers of this invention can be employed with any solvents, tackifiers, antioxidants, and the like which are conventionally employed in adhesive compositions.

EXAMPLE VI

Other runs were made employing the general procedures of Example I with different initiator levels and a monomer composition of Polymer 7 (Polymers 31–40) or Polymer 10 (Polymers 41–53). Different levels of silicon tetrachloride (SiCl$_4$) were employed in the termination of the runs. The amount of SiCl$_4$ employed was based on the amount of n-butyllithium initiator employed and is expressed in terms relative to the theoretical stoichiometric amount of SiCl₄ required to react with said initiator. The block copolymers thus prepared were individually compounded into the adhesive formulation recipe shown in Example I. The properties were determined as before and the results are shown below for these polymers and the adhesive formulations.

|  |  |  |  | Adhesive Properties | | |
| --- | --- | --- | --- | --- | --- | --- |
| Polymer | n-BuLi, mhm | SiCl₄, % of Theory | Inherent Viscosity | Viscosity, cp | Tack, g | Shear Adhesion, Hrs. |
| 31 | 2.0 | 60 | 1.13 | 10,800 | 680 | 8.0 |
| 32 | 2.0 | 80 | 1.32 | 11,000 | 770 | 1.6 |
| 33 | 2.0 | 100 | 1.34 | 15,500 | 810 | 8.0 |
| 34 | 2.0 | 120 | 1.24 | 10,000 | 740 | 6.5 |
| 35 | 2.0 | 140 | 1.22 | 22,000 | 800 | 8.0 |
| 36 | 2.2 | 60 | 1.20 | 4,150 | 720 | 4.5 |
| 37 | 2.2 | 80 | 1.40 | 9,200 | 700 | 13.0 |
| 38 | 2.2 | 100 | 1.29 | 3,900 | 750 | 7.6 |
| 39 | 2.2 | 120 | 1.28 | 4,950 | 750 | 5.7 |
| 40 | 2.2 | 140 | 1.02 | 8,200 | 860 | 8.0 |
| 41* | 1.6 | 60 | 1.50 | 2,100 | 700 | 16 |
| 42* | 1.6 | 80 | 1.82 | 4,800 | 720 | 28 |
| 43* | 1.6 | 120 | 1.77 | 3,950 | 690 | 31 |
| 44* | 1.6 | 140 | 1.80 | 5,160 | 660 | 33 |
| 45* | 1.8 | 60 | 1.58 | 1,700 | 710 | 15 |
| 46* | 1.8 | 80 | 1.49 | 1,380 | 650 | 17 |
| 47* | 1.8 | 120 | 1.55 | 2,100 | 640 | 23 |
| 48* | 1.8 | 140 | 1.44 | 1,290 | 710 | 15 |
| 49* | 2.0 | 60 | 1.22 | 470 | 770 | 2.0 |
| 50* | 2.0 | 80 | 1.47 | 1,050 | 760 | 11 |
| 51* | 2.0 | 100 | 1.38 | 890 | 750 | 8 |
| 52* | 2.0 | 120 | 1.42 | 1,000 | 800 | 7 |
| 53* | 2.0 | 140 | 1.10 | 1,330 | 830 | 9.5 |

*Invention runs.

The above data demonstrate the outstanding properties of the adhesive compositions of this invention, particularly the combination of good tack with very low formulation viscosity and exceptionally good shear adhesion values.

We claim:

1. A rubbery radial block copolymer consisting essentially of a conjugated diene containing 4 to 12 carbon atoms per molecule, styrene, and a hydrocarbyl-substituted styrene of the formula

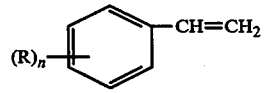

wherein R is a hydrocarbyl radical containing 1 to 12 carbon atoms selected from the group consisting of alkyl, cycloalkyl, aryl, alkenyl, cycloalkenyl, and combinations thereof and n is an integer having a value within the range of 1 to 5, said rubbery block copolymer having an inherent viscosity within the range of from about 0.5 to about 3 and being represented by the general formula $(A-B)_xZ$ wherein A is a resinous (nonrubbery) polymer block of styrene and hydrocarbyl-substituted styrene, B is a rubbery polymer block of conjugated diene, Z is a residue from a coupling agent, and x is greater than 2 and represents the number of (A—B—) polymer blocks coupled together, and wherein said block copolymer, based on 100 parts by weight of copolymer, contains from about 50 to about 90 parts by weight of said conjugated diene and from about 50 to about 10 parts by weight of said styrene and hydrocarbyl-substituted styrene and the amount of said hydrocarbyl-substituted styrene to the total of said conjugated diene, styrene, and hydrocarbyl-substituted styrene is within the range of from about 1 to about 20 parts by weight of said hydrocarbyl-substituted styrene per 100 parts by weight of the total of said conjugated diene, styrene, and hydrocarbyl-substituted styrene.

2. A composition according to claim 1 wherein said block polymer contains 60 parts by weight butadiene, 30 parts by weight styrene, and 10 parts by weight 4-ethylstyrene.

3. A composition according to claim 1 wherein said hydrocarbyl-substituted styrene is 4-tert-butylstyrene.

4. A composition according to claim 1 wherein said block polymer contains 60-70 parts by weight butadiene, 20-35 parts by weight styrene, and 1-20 parts by weight 4-tert-butylstyrene, and said coupling agent is silicon tetrachloride or a hexafunctional epoxidized linseed oil.

5. A composition according to claim 1 wherein said hydrocarbyl-substituted styrene is 4-methylstyrene or 4-ethylstyrene.

6. A composition according to claim 1 wherein said block polymer contains 70 parts by weight butadiene, 10-29 parts by weight styrene, and 1-20 parts by weight 4-methylstyrene.

7. A composition according to claim 1 wherein said conjugated diene is butadiene, said hydrocarbyl-substituted styrene is 4-methylstyrene, 4-ethylstyrene, or 4-tert-butylstyrene, and said coupling agent contains at least three reactive sites.

8. A composition according to claim 7 wherein the coupling agent is silicon tetrachloride or a hexafunctional epoxidized linseed oil.

* * * * *